United States Patent
Yao et al.

(10) Patent No.: US 11,643,526 B2
(45) Date of Patent: May 9, 2023

(54) RESIN COMPOSITION AND RESIN MOLDED PRODUCT

(71) Applicant: FUJIFILM Business Innovation Corp., Tokyo (JP)

(72) Inventors: Kenji Yao, Minamiashigara (JP); Hideaki Yoshikawa, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 383 days.

(21) Appl. No.: 16/854,882

(22) Filed: Apr. 21, 2020

(65) Prior Publication Data
US 2021/0130587 A1    May 6, 2021

(30) Foreign Application Priority Data
Oct. 31, 2019   (JP) .............. JP2019-198825

(51) Int. Cl.
  *C08L 1/12* (2006.01)
  *C08K 5/13* (2006.01)
  *C08L 1/14* (2006.01)
(52) U.S. Cl.
  CPC ............... *C08L 1/12* (2013.01); *C08K 5/13* (2013.01); *C08L 1/14* (2013.01)
(58) Field of Classification Search
  CPC ..... C08L 1/12; C08L 1/14; C08L 1/10; C08K 5/13
  See application file for complete search history.

(56) References Cited

U.S. PATENT DOCUMENTS

| 10,899,912 B2 | 1/2021 | Tanaka et al. |
| 2012/0202926 A1 | 8/2012 | Iji et al. |
| 2013/0305959 A1 | 11/2013 | Moon et al. |
| 2013/0310519 A1 | 11/2013 | Tanaka et al. |
| 2021/0040311 A1* | 2/2021 | Tanaka ............... C08L 1/14 |

FOREIGN PATENT DOCUMENTS

| CN | 110872388 | 3/2020 |
| DE | 102019103414 | 3/2020 |
| JP | 2000-309503 | 11/2000 |
| JP | 2015-081326 | 4/2015 |
| JP | 2018-118917 | 8/2018 |
| WO | 2014087801 | 6/2014 |
| WO | WO-2019171613 A1 * | 9/2019 ........ C08L 1/10 |

OTHER PUBLICATIONS

Office Action of Deutsches Counterpart Application, with English translation thereof, dated Apr. 4, 2022, pp. 1-5.
Office Action of China Counterpart Application, with English translation thereof, dated Jan. 28, 2023, pp. 1-17.

* cited by examiner

*Primary Examiner* — Jonathan S Lau
(74) *Attorney, Agent, or Firm* — JCIPRNET

(57) ABSTRACT

A resin composition includes a cellulose acylate (A); and an aromatic compound (B) not containing a functional group that reacts with the cellulose acylate (A), but containing a long-chain aliphatic group and at least one of a phenolic hydroxy group and a monoglycidyl ether group directly bonded to an aromatic group of the aromatic compound (B), in which a mass ratio (B)/(A) of the aromatic compound (B) to the cellulose acylate (A) is 0.15 or more.

20 Claims, No Drawings

RESIN COMPOSITION AND RESIN MOLDED PRODUCT

CROSS-REFERENCE TO RELATED APPLICATIONS

This application is based on and claims a priority under 35 USC 119 from Japanese Patent Application No. 2019-198825 filed on Oct. 31, 2019.

BACKGROUND

Technical Field

The present invention relates to a resin composition and a resin molded product.

Related Art

JP-A-2000-309503 discloses "a liquid or creamy cosmetic containing 1.0 wt % to 40 wt % of cellulose fine particles and/or cellulose composite fine particles which are fine particles having an average particle diameter of 0.2 μm to 20 μm and an L/D (L indicates a major axis of the cellulose particles or the composite particles, and D indicates a minor axis thereof) of 1.30 or less".

JP-A-2018-118917 discloses "a scrub agent containing porous cellulose particles, having a particle diameter of 100 μm or more and 1,000 μm or less in median diameter, a bulk specific gravity of 0.38 g/ml or more and 0.55 g/ml or less, and a biodegradation speed of 50 wt % or more within 10 days".

JP-A-2015-081326 discloses "a cellulose-based resin obtained by utilizing a hydroxy group of a cellulose or a derivative thereof and a phenolic hydroxy group of a cardanol derivative to bond a cardanol analog or a derivative thereof containing cardanol and cardol in a content of 3.0 wt/or more to the cellulose or the derivative thereof".

SUMMARY

Aspects of non-limiting embodiments of the present disclosure relate to a resin composition, from which a resin molded product with a high biodegradation speed may be obtained, compared with a case where in a resin composition containing a cellulose acylate (A) and an aromatic compound (B) not containing a functional group that reacts with the cellulose acylate (A), but containing a long-chain aliphatic group and at least one of a phenolic hydroxy group and a monoglycidyl ether group directly bonded to an aromatic group of the aromatic compound (B), a mass ratio (B)/(A) of the aromatic compound (B) to the cellulose acylate (A) is less than 0.15, or a solubility of the resin composition in methyl ethyl ketone is less than 200 mg/ml.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin composition containing: a cellulose acylate (A); and an aromatic compound (B) not containing a functional group that reacts with the cellulose acylate (A), but containing a long-chain aliphatic group and at least one of a phenolic hydroxy group and a monoglycidyl ether group directly bonded to an aromatic group of the aromatic compound (B), in which a mass ratio (B)/(A) of the aromatic compound (B) to the cellulose acylate (A) is 0.15 or more.

DETAILED DESCRIPTION

Hereinafter, an exemplary embodiment as an example of the present invention will be described. These descriptions and examples illustrate the exemplary embodiments, and do not limit the scope of the exemplary embodiments.

In the numerical ranges described in stages in this description, an upper limit or a lower limit described in one numerical range may be replaced with an upper limit or a lower limit of the numerical range described in other stages. Further, in the numerical ranges described in this description, the upper limit or the lower limit of the numerical range may be replaced with values shown in Examples.

In this description, the term "step" indicates not only an independent step, and even when a step may not be clearly distinguished from other steps, this step is included in the term "step" as long as the intended purpose of the step is achieved.

Each component may include a plurality of corresponding substances.

In a case of referring to the amount of each component in the composition, when there are a plurality of substances corresponding to each component in the composition, unless otherwise specified, it refers to the total amount of the plurality of substances present in the composition.

The term "(meth)acryl" means at least one of acryl and methacryl, and the term "(meth)acrylate" means at least one of acrylate and methacrylate.

In this description, a cellulose acylate (A) and an aromatic compound (B) are also referred to as a component (A) and a component (B), respectively.

<Resin Composition>

First Exemplary Embodiment

The resin composition according to the first exemplary embodiment contains a cellulose acylate (A) and an aromatic compound (B) not containing a functional group that reacts with the cellulose acylate (A), but containing a long-chain aliphatic group and at least one of a phenolic hydroxy group and a monoglycidyl ether group directly bonded to an aromatic group of the aromatic compound (B).

A mass ratio (B)/(A) of the aromatic compound (B) to the cellulose acylate (A) is 0.15 or more.

Here, in recent years, for the purpose of building a sustainable society for preventing global warming and protecting depleted resources, resin compositions containing bio-derived components instead of petroleum have been widely used.

In particular, environmental pollution and biological system destruction represented by marine plastic waste have occurred, so that a bio-derived and biodegradable resin molded product has been demanded.

On the other hand, many biodegradable resin molded products such as cellulose and polylactic acid have been reported.

However, the biodegradable resin molded products all have an inadequate biodegradation speed and a long living time in the environment, are eaten by organisms before decomposition, and are easily eaten by organisms due to their reduced shape due to decomposition.

In response to the above, from the resin composition according to the first exemplary embodiment, a resin molded product with high biodegradability may be obtained with the above configuration. The reasons are presumed as follows.

The cellulose acylate (A) (component (A)) is a compound having biodegradability.

The mechanism is that the molecular chain starts to be shortened by the hydrolysis of the component (A), and when the molecular chain reaches a certain length, biodegradation by microorganisms starts, and finally the component (A) becomes water, carbon dioxide and acid.

It takes some time until the molecular chain of the component (A) is hydrolyzed to a biodegradable length. This is one of the factors that slow down the biodegradation speed.

In addition, since the hydrolysis of the component (A) occurs randomly, distribution of long chains and short chains occurs after decomposition, and the short chains biodegrade relatively quickly, but the long chains remain. This is also a factor that makes it impossible to increase the biodegradation speed.

On the other hand, when the resin composition containing the cellulose acylate (A) (component (A)) and the aromatic compound (B) (component (B)) is exposed to moderate temperature and moisture such as compost, or to an alkaline atmosphere and moisture such as seawater, the monoglycidyl ether group or phenolic hydroxy group (hereinafter also referred to as "epoxy group or hydroxy group") of the component (B) has a weak binding force and an increased activity because the component (B) has a relatively long-chain aliphatic group. Therefore, the hydrolysis of the component (A) is promoted.

In addition, when the mass ratio (B)/(A) of the component (B) to the component (A) is 0.15 or more, the effect of promoting the hydrolysis of the component (A) by the epoxy group or hydroxy group of the aromatic compound (B) is increased, and the biodegradation speed of the obtained resin molded product is increased.

From the above, it is presumed that from the resin composition according to the first exemplary embodiment, a resin molded product with high biodegradability may be obtained with the above configuration.

Second Exemplary Embodiment

The resin composition according to the second exemplary embodiment contains a cellulose acylate (A) and an aromatic compound (B) not containing a functional group that reacts with the cellulose acylate (A), but containing a long-chain aliphatic group and at least one of a phenolic hydroxy group and a monoglycidyl ether group directly bonded to an aromatic group of the aromatic compound (B).

The solubility of the resin composition in methyl ethyl ketone at a liquid temperature of 25° C. is 200 mg/ml or more.

From the resin composition according to the second exemplary embodiment, a resin molded product with high biodegradability may be obtained with the above configuration. The reasons are presumed as follows.

The cellulose acylate (A) is difficult to dissolve alone in methyl ethyl ketone. On the other hand, the resin composition in which the aromatic compound (B) is mixed with the cellulose acylate (A) has an increased solubility in methyl ethyl ketone.

When the solubility of the resin composition in methyl ethyl ketone at a liquid temperature of 25° C. is 200 mg/ml or more, the intermolecular force of the cellulose acylate (A) weakens, and the aromatic compound (B) easily mixes between the molecules of the cellulose acylate (A). Therefore, as described above, the effecting of promoting the hydrolysis of the component (A) by the epoxy group or hydroxy group of the aromatic compound (B) is increased, and the biodegradation speed of the obtained resin molded product is increased.

From the above, it is presumed that from the resin composition according to the second exemplary embodiment, a resin molded product with high biodegradability may be obtained with the above configuration.

Hereinafter, the resin composition (hereinafter, also referred to as "the resin composition according to the present exemplary embodiment") that corresponds to both the resin compositions according to the first and second exemplary embodiments will be described in detail. However, an example of a toner of the present invention may be any toner that corresponds to one of the resin compositions according to the first and second exemplary embodiments.

Hereinafter, the resin composition according to the present exemplary embodiment will be described in detail.

[Cellulose Acylate (A): Component (A)]

The cellulose acylate (A) is a cellulose derivative in which at least a part of the hydroxy group in the cellulose is substituted (acylated) by an acyl group. The acyl group is a group having a structure of —CO—$R^{AC}$. $R^{AC}$ represents a hydrogen atom or a hydrocarbon group.

The cellulose acylate (A) is, for example, a cellulose derivative represented by the following general formula (CA).

General Formula (CA)

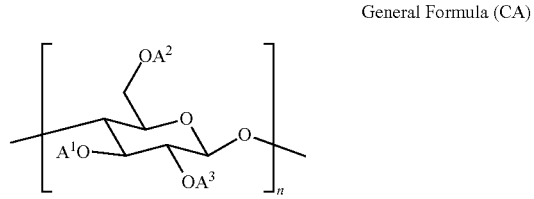

In the general formula (CA), $A^1$, $A^2$ and $A^3$ each independently represent a hydrogen atom or an acyl group, and n represents an integer of 2 or more. However, at least a part of n $A^1$s, n $A^2$s, and n $A^3$s represent an acyl group. The n A's in the molecule may be all the same, partly the same, or different from each other. Similarly, the n $A^2$s and n A's in the molecule may be all the same, partially the same, or different from each other.

In the acyl group represented by $A^1$, $A^2$ and $A^3$, the hydrocarbon group in the acyl group may be linear, branched, or cyclic, and is preferably linear or branched, and more preferably linear.

In the acyl group represented by $A^1$, $A^2$ and $A^3$, the hydrocarbon group in the acyl group may be a saturated hydrocarbon group or an unsaturated hydrocarbon group, and is more preferably a saturated hydrocarbon group.

The acyl group represented by $A^1$, $A^2$ and $A^3$ is preferably an acyl group having 1 or more and 6 or less carbon atoms. That is, the cellulose acylate (A) is preferably a cellulose acylate (A) containing an acyl group having 1 or more and 6 or less carbon atoms. A resin molded product having excellent impact resistance may be easily obtained when the cellulose acylate (A) contains an acyl group having 1 or more and 6 or less carbon atoms as compared with when a cellulose acylate (A) contains an acyl group having 7 or more carbon atoms.

The acyl group represented by $A^1$, $A^2$ and $A^3$ may be a group in which a hydrogen atom in the acyl group is substituted with a halogen atom (for example, a fluorine atom, a bromine atom, an iodine atom), an oxygen atom, a nitrogen atom, or the like, and is preferably unsubstituted.

Examples of the acyl group represented by $A^1$, $A^2$ and $A^3$ include a formyl group, an acetyl group, a propionyl group, a butyryl group (a butanoyl group), a propenoyl group, and a hexanoyl group. Among these, the acyl group is preferably an acyl group having 2 or more and 4 or less carbon atoms, and more preferably an acyl group having 2 or 3 carbon atoms, from the viewpoints of moldability of the resin composition and improvement in biodegradation speed of the resin molded product.

Examples of the cellulose acylate (A) include cellulose acetate (cellulose monoacetate, cellulose diacetate (DAC), and cellulose triacetate), cellulose acetate propionate (CAP), and cellulose acetate butyrate (CAB).

From the viewpoints of improvement in biodegradation speed of the resin molded product, the cellulose acylate (A) is preferably cellulose acetate propionate (CAP) or cellulose acetate butyrate (CAB), and more preferably cellulose acetate propionate (CAP).

The cellulose acylate (A) may be used alone or in combination of two or more thereof.

The weight average polymerization degree of the cellulose acylate (A) is preferably 200 or more and 1,000 or less, more preferably 500 or more and 1,000 or less, and still more preferably 600 or more and 1,000 or less, from the viewpoint of the moldability of the resin composition, the impact resistance of the resin molded product, or excellent toughness of the resin molded product.

The weight average polymerization degree of the cellulose acylate (A) is determined based on a weight average molecular weight (Mw) according to the following procedure.

First, the weight average molecular weight (Mw) of the cellulose acylate (A) is measured using tetrahydrofuran with a gel permeation chromatography apparatus (GPC apparatus: HLC-8320GPC, manufactured by Tosoh Corporation, column: TSK gelα-M) in terms of polystyrene.

Next, the polymerization degree of the cellulose acylate (A) is obtained by dividing by the structural unit molecular weight of the cellulose acylate (A). For example, in a case where the substituent of cellulose acylate is an acetyl group, the structural unit molecular weight is 263 when the substitution degree is 2.4, and is 284 when the substitution degree is 2.9.

The substitution degree of the cellulose acylate (A) is preferably 2.1 or more and 2.9 or less, more preferably 2.2 or more and 2.9 or less, still more preferably 2.3 or more and 2.9 or less, and particularly preferred is 2.6 or more and 2.9 or less, from the viewpoints of the moldability of the resin composition and the improvement in biodegradation speed of the resin molded product.

In the cellulose acetate propionate (CAP), a ratio of degrees of substitution of the acetyl group to the propionyl group (acetyl group/propionyl group) is preferably 0.01 or more and 1 or less, and more preferably 0.05 or more and 0.1 or less, from the viewpoints of the moldability of the resin composition and the improvement in biodegradation speed of the resin molded product.

In the cellulose acetate butyrate (CAB), a ratio of degrees of substitution of the acetyl group to the butyryl group (acetyl group/butyryl group) is preferably 0.05 or more and 3.5 or less, and more preferably 0.5 or more and 3.0 or less, from the viewpoints of the moldability of the resin composition and the improvement in biodegradation speed of the resin molded product.

The degree of substitution of the cellulose acylate (A) is an index indicating a degree to which the hydroxy group of the cellulose is substituted with the acyl group. That is, the degree of substitution is an index indicating a degree of acylation of the cellulose acylate (A). Specifically, the degree of substitution means an intramolecular average of the number of substitution in which three hydroxy groups in a D-glucopyranose unit of the cellulose acylate are substituted with the acyl group. The degree of substitution is determined from a ratio of a peak integral of a cellulose-derived hydrogen to a peak integral of an acyl group-derived hydrogen with $^1$H-NMR (JMN-ECA, manufactured by JEOL RESONANCE Co., Ltd.).

[Aromatic Compound (B): Component (B)]

The aromatic compound (B) is an aromatic compound not containing a functional group that reacts with the cellulose acylate (A), but containing a long-chain aliphatic group and at least one of a phenolic hydroxy group and a monoglycidyl ether group directly bonded to an aromatic group of the aromatic compound (B).

That is, the aromatic compound (B) is a compound not containing a functional group that reacts with the cellulose acylate (A), but containing a long-chain aliphatic group and at least one of a phenolic hydroxy group and a monoglycidyl ether group.

Here, examples of the long-chain aliphatic group include a saturated aliphatic group (for example, alkyl group) and an unsaturated aliphatic group (for example, alkenyl group or alkynyl group) having preferably 6 or more and 30 or less carbon atoms and more preferably 10 or more and 20 or less carbon atoms. The aliphatic group may be linear, branched or cyclic, and is preferably linear or branched, and more preferably linear.

Examples of the aromatic compound (B) include a compound in which a phenolic hydroxy group is substituted on a monocyclic ring, a condensed ring which is a polycyclic ring having two or more aromatic rings, a polynuclear ring which is a polycyclic ring in which aromatic rings are linked by a carbon-carbon bond, or a heterocyclic ring which is a monocyclic ring of a heterocyclic ring, a condensed ring containing a heterocyclic ring, a polynuclear ring containing a heterocyclic ring, etc. together with a long-chain aliphatic group.

Specific examples of the aromatic compound (B) include a cardanol compound, a phenalkamine compound, a phenolic resin, a phenol novolak epoxy resin, a phenol resol epoxy resin, phenol-modified palm oil, phenol-modified soybean oil, and phenol-modified linseed oil.

Among these, the cardanol compound (B1) is preferred as the aromatic compound (B) from the viewpoint of improving the biodegradability.

The cardanol compound (B1) refers to a component (for example, compounds represented by the following structural formulas (b-1) to (b-4)) contained in a compound naturally derived from cashew or a derivative from the component.

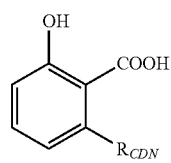

(b-1)

(b-2)

[Structure: phenol with R_CDN at meta position]

(b-3)

[Structure: 3,5-dihydroxyphenyl with R_CDN]

(b-4)

[Structure: 2-methyl-3,5-dihydroxyphenyl with R_CDN, and R_CDN shown as four C15 chains with varying unsaturation]

The cardanol compound (B1) may be a mixture of compounds naturally derived from cashew (hereinafter also referred to as "cashew-derived mixture").

The cardanol compound (B1) may be a derivative from the cashew-derived mixture. Examples of the derivative from the cashew-derived mixture include the following mixtures and pure substances.

- A mixture obtained by adjusting a composition ratio of each component in the cashew-derived mixture
- A pure substance obtained by isolating only a specific component from the cashew-derived mixture
- A mixture containing a modified product obtained by modifying a component in the cashew derived mixture
- A mixture containing a polymer obtained by polymerizing a component in the cashew-derived mixture
- A mixture containing a modified polymer obtained by modifying and polymerizing a component in the cashew-derived mixture
- A mixture containing a modified product obtained by further modifying a component in the mixture whose composition ratio is adjusted
- A mixture containing a polymer obtained by further polymerizing a component in the mixture whose composition ratio is adjusted
- A mixture containing a modified polymer obtained by further modifying and polymerizing a component in the mixture whose composition ratio is adjusted
- A modified product obtained by further modifying the isolated pure substance
- A polymer obtained by further polymerizing the isolated pure substance
- A modified polymer obtained by further modifying and polymerizing the isolated pure substance Here, a pure substance includes a multimer such as a dimer and a trimer.

The cardanol compound (B1) is preferably at least one compound selected from the group consisting of a compound represented by the general formula (CDN1) and a polymer obtained by polymerizing a compound represented by the general formula (CDN1), from the viewpoint of improving the biodegradation speed of the resin molded product.

General Formula (CDN1)

[Structure: phenol with $R^1$ and $(R^2)_{P2}$ substituents]

In the general formula (CDN1), $R^1$ represents an alkyl group which may have a substituent, or an unsaturated aliphatic group which has a double bond and may have a substituent. $R^2$ represents a hydroxy group, a carboxy group, an alkyl group which may have a substituent, or an unsaturated aliphatic group which has a double bond and may have a substituent. P2 represents an integer of 0 or more and 4 or less. When P2 is 2 or more, a plurality of $R^2$s may be the same group or different groups.

In the general formula (CDN1), the alkyl group which may have a substituent represented by $R^1$ is preferably an alkyl group having 3 or more and 30 or less carbon atoms, more preferably an alkyl group having 5 or more and 25 or less carbon atoms, and still more preferably an alkyl group having 8 or more and 20 or less carbon atoms.

Examples of the substituent include: a hydroxy group; a substituent containing an ether bond, such as an epoxy group and a methoxy group; and a substituent containing an ester bond, such as an acetyl group and a propionyl group.

Examples of the alkyl group which may have a substituent include a pentadecane-1-yl group, a heptane-1-yl group, an octane-1-yl group, a nonan-1-yl group, a decane-1-yl group, an undecane-1-yl group, a dodecane-1-yl group, and a tetradecane-1-yl group.

In the general formula (CDN1), the unsaturated aliphatic group which has a double bond and may have a substituent represented by R is preferably an unsaturated aliphatic group having 3 or more and 30 or less carbon atoms, more preferably an unsaturated aliphatic group having 5 or more and 25 or less carbon atoms, and still more preferably an unsaturated aliphatic group having 8 or more and 20 or less carbon atoms.

The number of the double bond in the unsaturated aliphatic group is preferably 1 or more and 3 or less.

Examples of the substituent also include those listed above as the substituent of the alkyl group.

Examples of the unsaturated aliphatic group which has a double bond and may have a substituent include a pentadeca-8-en-1-yl group, a pentadeca-8,11-dien-1-yl group, a pentadeca-8,11,14-trien-1-yl group, a pentadeca-7-en-1-yl group, a pentadeca-7,10-dien-1-yl group, and a pentadeca-7,10,14-trien-1-yl group.

In the general formula (CDN1), $R^1$ is preferably a pentadeca-8-en-1-yl group, a pentadeca-8,11-dien-1-yl group, a pentadeca-8,11,14-trien-1-yl group, a pentadeca-7-en-1-yl group, a pentadeca-7,10-dien-1-yl group, and a pentadeca-7,10,14-trien-1-yl group.

In the general formula (CDN1), preferred examples of the alkyl group which may have a substituent and the unsaturated aliphatic group which has a double bond and may have a substituent represented by $R^2$ include those listed above as the alkyl group which may have a substituent and the unsaturated aliphatic group which has a double bond and may have a substituent represented by $R^1$.

The compound represented by the general formula (CDN1) may be further modified. For example, the compound represented by the general formula (CDN1) may be epoxidized. Specifically, the compound represented by the general formula (CDN1) may be a compound having a structure in which a hydroxy group of the compound represented by the general formula (CDN1) is substituted by the following group (EP), that is, a compound represented by the following general formula (CDN1-e).

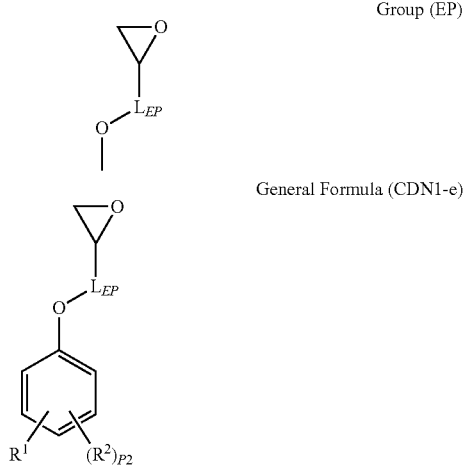

Group (EP)

General Formula (CDN1-e)

In the group (EP) and the general formula (CDN1-e), $L_{EP}$ represents a single bond or a divalent linking group. In the general formula (CDN1-e), $R^1$, $R^2$ and P2 have the same meanings as $R^1$, $R^2$ and P2 in the general formula (CDN1), respectively.

In the group (EP) and the general formula (CDN1-e), examples of the divalent linking group represented by $L_{EP}$ include an alkylene group which may have a substituent (preferably an alkylene group having 1 or more and 4 or less carbon atoms, and more preferably an alkylene group having 1 carbon atom), and a —$CH_2CH_2OCH_2CH_2$— group.

Examples of the substituent also include those listed above as the substituent of $R^1$ in the general formula (CDN1).

$L_{EP}$ is preferably a methylene group.

The polymer obtained by polymerizing the compound represented by the general formula (CDN1) refers to a polymer obtained by polymerizing at least two or more compounds represented by the general formula (CDN1) with or without a linking group.

Examples of the polymer obtained by polymerizing the compound represented by the general formula (CDN1) include a compound represented by the following general formula (CDN2).

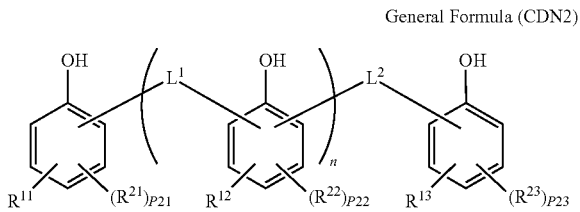

General Formula (CDN2)

In the general formula (CDN2), $R^{11}$, $R^{12}$ and $R^{13}$ each independently represent an alkyl group which may have a substituent, or an unsaturated aliphatic group which has a double bond and may have a substituent. $R^{21}$, $R^{22}$ and $R^{23}$ each independently represent a hydroxy group, a carboxy group, an alkyl group which may have a substituent, or an unsaturated aliphatic group which has a double bond and may have a substituent. P21 and P23 each independently represent an integer of 0 or more and 3 or less, and P22 represents an integer of 0 or more and 2 or less. $L^1$ and $L^2$ each independently represent a divalent linking group. n represents an integer of 0 or more and 10 or less. When P21 is 2 or more, a plurality of $R^{21}$S may be the same group or different groups; when P22 is 2 or more, a plurality of $R^{22}$s may be the same group or different groups; and when P23 is 2 or more, a plurality of $R^{23}$s may be the same group or different groups. When n is 2 or more, a plurality of $R^{12}$s, $R^{22}$s and $L^1$s may respectively be the same group or different groups; and when n is 2 or more, a plurality of $P^{22}$s may be the same number or different numbers.

In the general formula (CDN2), preferred examples of the alkyl group which may have a substituent and the unsaturated aliphatic group which has a double bond and may have a substituent represented by $R^{11}$, $R^{12}$, $R^{13}$, $R^{21}$, $R^{22}$, and $R^{23}$ include those listed above as $R^1$ in the general formula (CDN1).

In the general formula (CDN2), examples of the divalent linking group represented by $L^1$ and $L^2$ include an alkylene group which may have a substituent (preferably an alkylene group having 2 or more and 30 or less carbon atoms, and more preferably an alkylene group having 5 or more and 20 or less carbon atoms).

Examples of the substituent also include those listed above as the substituent of $R^1$ in the general formula (CDN1).

In the general formula (CDN2), n is preferably 1 or more and 10 or less, and more preferably 1 or more and 5 or less.

The compound represented by the general formula (CDN2) may be further modified. For example, the compound represented by the general formula (CDN2) may be epoxidized. Specifically, the compound represented by the general formula (CDN2) may be a compound having a structure in which a hydroxy group of the compound represented by the general formula (CDN2) is substituted by the group (EP), that is, a compound represented by the following general formula (CDN2-e).

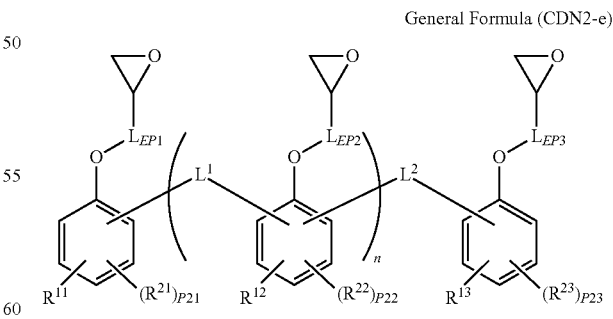

General Formula (CDN2-e)

In the general formula (CDN2-e), $R^{11}$, $R^{12}$, $R^{13}$, $R^{21}$, $R^{22}$, $R^{23}$, P21, P22, P23, $L^1$, $L^2$, and n have the same meanings as $R^{11}$, $R^{12}$, $R^{13}$, $R^{21}$, $R^{22}$, $R^{23}$, P21, P22, P23, $L^1$, $L^2$, and n in the general formula (CDN2), respectively.

In the general formula (CDN2-e), $L_{EP1}$, $L_{EP2}$ and $L_{EP3}$ each independently represent a single bond or a divalent linking group. When n is 2 or more, a plurality of $L_{EP2}$s may be the same group or different groups.

In the general formula (CDN2-e), preferred examples of the divalent linking group represented by $L_{EP1}$, $L_{EP2}$ and $L_{EP3}$ include those listed above as the divalent linking group represented by $L_{EP}$ in the general formula (CDN1-e).

The polymer obtained by polymerizing the compound represented by the general formula (CDN1) may be, for example, a polymer obtained by three-dimensionally cross-linking-polymerizing at least three or more compounds represented by the general formula (CDN1) with or without a linking group. Examples of the polymer obtained by three-dimensionally crosslinking-polymerizing the compound represented by the general formula (CDN1) include a compound represented by the following structural formula.

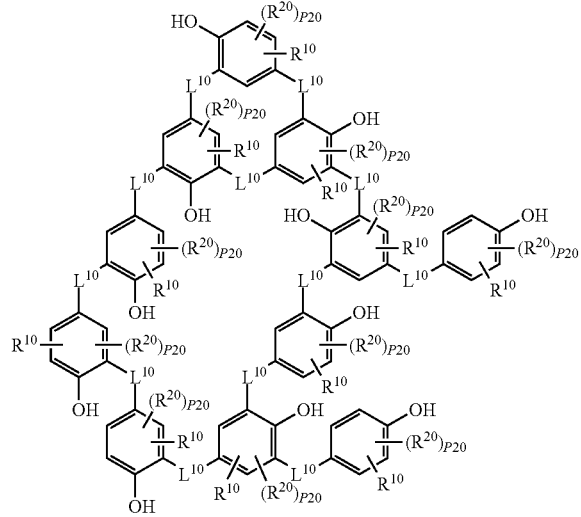

In the above structural formula $R^{10}$, $R^{20}$ and P20 have the same meanings as $R^1$, $R^2$ and P2 in the general formula (CDN1), respectively. $L^{10}$ represents a single bond or a divalent linking group. A plurality of $R^{10}$s, $R^{20}$s, and $L^{10}$s may each independently be the same group or different groups. A plurality of P20s may have the same number or different numbers.

In the above structural formula, examples of the divalent linking group represented by $L^{10}$ include an alkylene group which may have a substituent (preferably an alkylene group having 2 or more and 30 or less carbon atoms, and more preferably an alkylene group having 5 or more and 20 or less carbon atoms).

Examples of the substituent also include those listed above as the substituent of $R^1$ in the general formula (CDN1).

The compound represented by the above structural formula may be further modified, for example, may be epoxidized. Specifically, the compound represented by the above structural formula may be a compound having a structure in which a hydroxy group of the compound represented by the above structural formula is substituted by the group (EP), for example, a compound represented by the following structural formula, that is, a polymer obtained by three-dimensionally cross inking-polymerizing the compound represented by the general formula (CDN1-e).

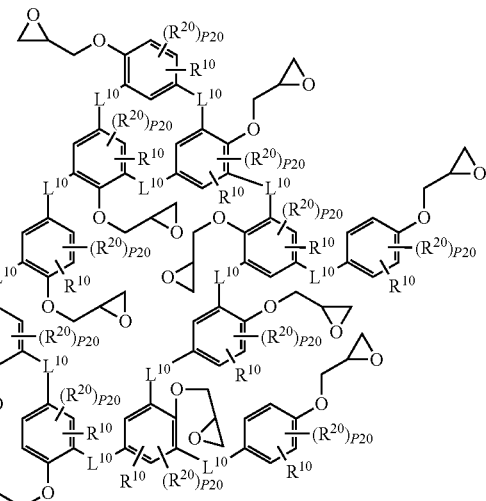

In the above structural formula, $R^{10}$, $R^{20}$ and P20 have the same meanings as $R^1$, $R^2$ and P2 in the general formula (CDN1-e), respectively. $L^{10}$ represents a single bond or a divalent linking group. A plurality of $R^{10}$s, $R^{20}$s, and $L^{10}$s may each independently be the same group or different groups. A plurality of P20s may have the same number or different numbers.

In the above structural formula, examples of the divalent linking group represented by $L^{10}$ include an alkylene group which may have a substituent (preferably an alkylene group having 2 or more and 30 or less carbon atoms, and more preferably an alkylene group having 5 or more and 20 or less carbon atoms).

Examples of the substituent also include those listed above as the substituent of $R^1$ in the general formula (CDN1).

The cardanol compound (B1) preferably contains the cardanol compound (B1) having an epoxy group, and more preferably is the cardanol compound (B1) having an epoxy group, from the viewpoint of improving transparency of the resin molded product.

As the cardanol compound (B1), a commercially available product may be used. Examples of the commercially available product include NX-2024, Ultra LITE 2023, NX-2026, GX-2503, NC-510, LITE 2020, NX-9001, NX-9004, NX-9007, NX-9008, NX-9201, and NX-9203 manufactured by Cardolite Corporation, and LB-7000, LB-7250, and CD-5L manufactured by Tohoku Chemical Industries, Ltd. Examples of the commercially available product of the cardanol compound having an epoxy group include NC-513, NC-514S, NC-547, LITE 513E, and Ultra LTE 513 manufactured by Cardolite Corporation.

The hydroxyl value of the cardanol compound (B1) is preferably 100 mgKOH/g or more, more preferably 120 mgKOH/g or more, and still more preferably 150 mgKOH/g, from the viewpoint of improving the biodegradation speed of the resin molded product. The hydroxyl value of the cardanol compound (B) is measured according to the method A of ISO 14900.

When using the cardanol compound (B1) having an epoxy group as the cardanol compound (B1), the epoxy equivalent thereof is preferably 300 or more and 500 or less, more preferably 350 or more and 480 or less, and still more preferably 400 or more and 470 or less, from the viewpoint of improving the transparency of the resin molded product.

The epoxy equivalent of the cardanol compound (B1) having an epoxy group is measured according to ISO 3001.

The molecular weight of the cardanol compound (B1) is preferably 250 or more and 1,000 or less, more preferably 280 or more and 800 or less, still more preferably 300 or more and 500 or less, from the viewpoint of improving the biodegradation speed of the resin molded product.

The cardanol compound (B1) may be used alone or in combination of two or more thereof.

[Contents of Component (A) and Component (B) and Mass Ratio Thereof]

Abbreviations of the components are as follows.

Component (A)=cellulose acylate (A)

Component (B)=aromatic compound (B)

The mass ratio (B)/(A) of the component (B) to the component (A) is 0.15 or more.

When the mass ratio (B)/(A) is less than 0.15, the hydrolysis effect of the component (A) by the component (B) is insufficient, and a high biodegradation speed may not be obtained.

However, when the mass ratio (B)/(A) is excessively large, even in a normal environment such as an environment before being charged into a compost container or before entering seawater, the hydrolysis of the component (A) may occur, and durability during the use of the resin molded product may be reduced. Therefore, from the viewpoint of preventing an excessive biodegradation speed, the mass ratio (B)/(A) is preferably 0.80 or less.

From the viewpoint of improving the biodegradation speed while imparting the durability during the use of the resin molded product, the mass ratio (B)/(A) is preferably 0.15 or more and 0.80 or less, and more preferably 0.20 or more and 0.50 or less.

Here, from the viewpoint of improving the biodegradation speed, the component (A) and the component (B) are preferably contained as main components.

Here, "the component (A) and the component (B) are the main components" means that the total amount of the component (A) and the component (B) occupying the entire resin composition is the largest.

Specifically, the total amount of the component (A) and the component (B) is 50 mass % or more, 60 mass % or more, 70 mass % or more, 80 mass/or more, 90 mass % or more, 95 mass %, or 100 mass %, with respect to the entire resin composition.

[Other Components]

The resin composition according to the present exemplary embodiment may contain other components.

Examples of the other components include a plasticizer, a flame retardant, a compatibilizer, a release agent, a light-resistant agent, a weathering agent, a colorant, a pigment, a modifier, an anti-drip agent, an antistatic agent, a hydrolysis inhibitor, a filler, a reinforcing agent (glass fiber, carbon fiber, talc, clay, mica, glass flake, milled glass, glass beads, crystalline silica, alumina, silicon nitride, aluminum nitride, boron nitride, etc.), an acid acceptor for preventing acetic acid from releasing (oxides such as magnesium oxide and aluminum oxide; metal hydroxides such as magnesium hydroxide, calcium hydroxide, aluminum hydroxide and hydrotalcite; calcium carbonate; talc; etc.), and a reactive trapping agent (e.g., an epoxy compound, an acid anhydride compound, carbodiimides, etc.).

The content of the other components is preferably from 0 mass % or more and 5 mass % or less with respect to the total amount of the resin composition. Here, "0 mass % by mass" means that other components are not contained in the resin composition.

Examples of the plasticizer include an ester compound, camphor, metal soap, polyol, and polyalkylene oxide. The plasticizer is preferably an ester compound from the viewpoint of the impact resistance of the resin molded product. The plasticizer may be used alone or in combination of two or more thereof.

Examples of the ester compound contained as a plasticizer in the resin composition according to the present exemplary embodiment include adipates, citrates, sebacates, azelates, phthalates, acetates, dibasic acid esters, phosphates, condensed phosphates, glycol esters (e.g., glycol benzoate), and modified fatty acid esters (e.g., epoxidized fatty acid esters). Examples of the above ester include a monoester, a diester, a triester, and a polyester. Among these, dicarboxylic acid diesters (adipic diester, sebacic diester, azelaic diester, phthalic diester, etc.) are preferred.

The plasticizer is preferably an adipate ester. The adipate ester has a high affinity with the cellulose acylate (A), and is dispersed in a nearly uniform state in the cellulose acylate (A), thereby improving heat fluidity more than other plasticizers.

As the adipate ester, a mixture of the adipate ester and other components may be used. Examples of the commercially available product of the mixture include Daifatty 101 manufactured by DAIHACHI CHEMICAL INDUSTRY CO., LTD.

Examples of the fatty acid ester such as citrates, sebacates, azelaates, phthalates and acetates include an ester of a fatty acid and an alcohol. Examples of the alcohol include: monohydric alcohols such as methanol, ethanol, propanol, butanol, and 2-ethylhexanol; and polyhydric alcohols such as glycerin, polyglycerin (such as diglycerin), pentaerythritol, ethylene glycol, diethylene glycol, propylene glycol, butylene glycol, trimethylolpropane, trimethylol ethane, and a sugar alcohol.

Examples of the glycol in the glycol benzoate include ethylene glycol, diethylene glycol, and propylene glycol.

The epoxidized fatty acid ester is an ester compound having a structure (that is, oxacyclopropane) in which an unsaturated carbon-carbon bond of an unsaturated fatty acid ester is epoxidized. Examples of the epoxidized fatty acid ester include an ester of a fatty acid and an alcohol in which some or all of the unsaturated carbon-carbon bond in the unsaturated fatty acids (for example, oleic acid, palmitoleic acid, vaccenic acid, linoleic acid, linolenic acid, and nervonic acid) is epoxidized. Examples of the alcohol include: monohydric alcohols such as methanol, ethanol, propanol, butanol, and 2-ethylhexanol; and polyhydric alcohols such as glycerin, polyglycerin (such as diglycerin), pentaerythritol, ethylene glycol, diethylene glycol, propylene glycol, butylene glycol, trimethylolpropane, trimethylol ethane, and a sugar alcohol.

The ester compound contained as a plasticizer in the resin composition according to the present exemplary embodiment preferably has a molecular weight (or a weight average molecular weight) of 200 or more and 2000 or less, more preferably 250 or more and 1500 or less, and still more preferably 280 or more and 1000 or less. The weight average molecular weight of the ester compound is a value measured according to the method for measuring the weight average molecular weight of the cellulose acylate (A) unless otherwise specified.

The resin composition according to according to the present exemplary embodiment may contain a resin other than the component (A), the component (B), the component (C) and the component (D). However, in the case of containing other resins, the content of other resins with respect to the total amount of the resin composition is preferably 5 mass % or less, and more preferably less than 1 mass %. It is more preferable to not contain other resins in the resin composition (that is, 0 mass %).

Examples of other resins include conventionally known thermoplastic resins. Specific examples thereof include: a polycarbonate resin; a polypropylene resin; a polyester resin; a polyolefin resin; a polyester carbonate resin; a polyphenylene ether resin; a polyphenylene sulfide resin; a polysulfone resin; a polyether sulfone resin; a polyarylene resin; polyether imide resin; a polyacetal resin; a polyvinyl acetal resin; a polyketone resin; a polyether ketone resin; a polyether ether ketone resin; a polyaryl ketone resin; a polyether nitrile resin; a liquid crystal resin; a polybenzimidazole resin; a polyparabanic acid resin; a vinyl polymer or copolymer obtained by polymerizing or copolymerizing one or more vinyl monomers selected from the group consisting of an aromatic alkenyl compound, a methacrylic acid ester, an acrylic acid ester, and a vinyl cyanide compound; a diene-aromatic alkenyl compound copolymer; a vinyl cyanide-diene-aromatic alkenyl compound copolymer; an aromatic alkenyl compound-diene-vinyl cyanide-N-phenyl maleimide copolymer; a vinyl cyanide-(ethylene-diene-propylene (EPDM))-aromatic alkenyl compound copolymer; a vinyl chloride resin; and a chlorinated vinyl chloride resin. These resins may be used alone or in combination of two or more thereof.

[Properties of Resin Composition]

In the resin composition according to the present exemplary embodiment, the solubility of the resin composition in methyl ethyl ketone at a liquid temperature of 25° C. is 200 mg/ml or more.

When the solubility of the resin composition is 200 mg/ml or more, the effect of promoting the hydrolysis of the component (A) by the epoxy group or hydroxy group of the aromatic compound (B) is increased, and the biodegradation speed of the obtained resin molded product is increased.

The solubility of the resin composition is preferably 250 mg/ml or more, and more preferably 300 mg/ml or more.

The solubility of the resin composition is measured as follows.

In a container, 100 ml of methyl ethyl ketone at a liquid temperature of 25° C. and 50000 mg of the resin composition to be measured are mixed, then ultrasonic waves having an oscillation frequency of 38 kHz are applied for 480 minutes, and then the mixed solution is left for 3 hours.

Next, the solution in the container is filtered with a filter having an aperture of 25 μm, and the dry mass of the residue on the filter is measured.

Then, the solubility is calculated according to the formula: solubility=(mass of resin composition dissolved in 100 ml of methyl ethyl ketone)/(100 ml of methyl ethyl ketone).

[Method for Producing Resin Composition]

Examples of the method for producing the resin composition according to the present exemplary embodiment include: a method of mixing and melt-kneading the component (A), the component (B), at least one of the component (C) and the component (D), and other components as necessary; and a method of dissolving the component (A), the component (B), at least one of the component (C) and the component (D), and other components as necessary in a solvent.

The means for melt-kneading is not particularly limited, and examples thereof include a twin-screw extruder, a Henschel mixer, a Banbury mixer, a single-screw extruder, a multi-screw extruder, and a kneader.

<Resin Molded Product>

The resin molded product according to the present exemplary embodiment contains the resin composition according to the present exemplary embodiment. That is, the resin molded product according to the present exemplary embodiment has the same composition as the resin composition according to the present exemplary embodiment.

Here, among plastic wastes, granular materials (for example, granular materials having a particle diameter of 1000 μm or less) called microbeads easily pass through various filters and flow out to the environment such as the ocean, and are required to have biodegradability faster than that of resin molded products such as plastic bags or straws.

Therefore, the resin molded product according to the present exemplary embodiment having rapid biodegradability may have any desired shape, and is preferably a granular material (hereinafter, also referred to as "resin particle").

The volume average particle diameter of the granular material is preferably 3 μm or more and 100 μm or less, more preferably 5 μm or more and 70 μm or less, and still more preferably 8 μm or more and 60 μm or less.

When the particle diameter of the granular material is 3 μm or more, the number of particles per unit weight is not too large, so that a decrease in the biodegradation speed is prevented. On the other hand, when the particle diameter of the granular material is 100 μm or less, the specific surface area is increased, and the biodegradation speed is further improved.

Therefore, the volume average particle diameter of the granular material is preferably in the above range.

The large-diameter-side particle size distribution index GSDv of the granular material is preferably 1.5 or less, more preferably 1.3 or less, and still more preferably 1.2 or less.

When the particle size distribution of the granular material is made nearly uniform, regular hydrolysis proceeds by giving a certain chance of contact with water, and the biodegradation speed is further improved.

The volume average particle diameter and the large-diameter-side particle size distribution index GSDv of the granular material are measured as follows.

The particle diameter is measured with an LS particle size distribution measuring device "Beckman Coulter LS13 320 (manufactured by Beckman Coulter, Inc.)", the cumulative distribution of the particle diameter is drawn from the smaller diameter side on a volume basis, and the particle diameter at which the cumulation is 50% is determined as the volume average particle diameter.

On the other hand, the cumulative distribution of the particle diameter is drawn from the smaller diameter side on a volume basis, and the particle diameter corresponding to the cumulative percentage of 50% is defined as a number average particle diameter D50v, and the particle diameter corresponding to the cumulative percentage of 84% is defined as a number particle diameter D84v. Then, the large-diameter-side particle size distribution index GSDv is calculated according to the equation $GSDv=(D84v/D50v)^{1/2}$.

Examples of the method for producing the granular material include the following methods.

1) a kneading and pulverizing method in which respective components are kneaded, and the obtained kneaded material is pulverized and classified to obtain a granular material 2) a dry production method in which the granular material obtained by kneading and pulverization is changed in shape by mechanical impact or thermal energy to obtain a granular material 3) an aggregation and coalescence method in which particle dispersion liquids of respective components are mixed, and the particles in the dispersion liquid are agglomerated and heated and fused to obtain a granular material 4) a solution suspension method in which an organic solvent in which respective components are dissolved is suspended in an aqueous solvent, and a granular material containing respective components are granulated Among these, from the viewpoint of obtaining a granular material having a volume average particle diameter and a large-diameter-side particle size distribution index GSDv in the above ranges, a wet method such as an aggregation and coalescence method and a solution suspension method is preferred.

The method for molding the resin molded product according to the present exemplary embodiment may be an injection molded product obtained by injection molding from the viewpoint of high degree of freedom in shape.

The cylinder temperature when injection-molding the resin molded product according to the present exemplary embodiment is, for example, 160° C. or higher and 280° C. or lower, and preferably 180° C. or higher and 240° C. or lower. The mold temperature when injection-molding the resin molded product according to the present exemplary embodiment is, for example, 40° C. or higher and 90° C. or lower, and more preferably 40° C. or higher and 60° C. or lower.

The injection molding of the resin molded product according to the present exemplary embodiment may be performed with a commercially available device such as NEX500 manufactured by NISSEI PLASTIC INDUSTRIAL CO., LTD., NEX150 manufactured by NISSEI PLASTIC INDUSTRIAL CO., LTD., NEX7000 manufactured by NISSEI PLASTIC INDUSTRIAL CO., LTD., PNX40 manufactured by NISSEI PLASTIC INDUSTRIAL CO., LTD., and SE50D manufactured by Sumitomo Heavy Industries, Ltd.

The resin molded product according to the present exemplary embodiment may be a resin molded product obtained by another molding method. Examples of another molding method include extrusion molding, blow molding, hot press molding, calendar molding, coating molding, cast molding, dipping molding, vacuum molding, and transfer molding.

Examples of uses of the resin molded product according to the present exemplary embodiment include granular materials of cosmetic base materials, rolling agents, abrasives, scrub agents, display spacers, beads molding materials, light diffusing particles, resin reinforcing agents, refractive index controlling agents, biodegradation accelerators, fertilizers, water-absorbing particles, or toner particles.

The resin molded product according to the present exemplary embodiment is suitably used for other applications such as electronic/electrical equipment, office equipment, home electric appliances, automobile interior materials, toys, containers and the like. Examples of a specific use of the resin molded product according to the present exemplary embodiment include: housings for electronic/electrical equipment or home electric appliances; carious parts of electronic/electrical equipment or home electric appliances; automotive interior parts; block assembly toys; plastic model kits; CD-ROM or DVD storage cases; tableware; beverage bottles; food trays; wrapping materials; films; and sheets.

EXAMPLES

Hereinafter, the resin composition and the resin molded product according to the present exemplary embodiment will be described more specifically with reference to Examples. Materials, used amounts, ratios, processing procedures, and the like shown in the following Examples may be appropriately changed without departing from the spirit of the present invention. Therefore, the resin composition and the resin molded product according to the present exemplary embodiment should not be interpreted in a limited manner by the following specific Examples.

<Preparation of Materials>

The following materials are prepared.

[Cellulose Acylate (A)]
- CA1: Eastman Chemical "CAP482-20", cellulose acetate propionate, having a weight average degree of polymerization of 716, a degree of acetyl group substitution of 0.18, and a degree of propionyl group substitution of 2.49.
- CA2: Eastman Chemical "CAP504-0.2", cellulose acetate propionate, having a weight average degree of polymerization of 133, a degree of acetyl group substitution of 0.04, and a degree of propionyl group substitution of 2.09.
- CA3: Eastman Chemical "CAB171-15", cellulose acetate butyrate, having a weight average degree of polymerization of 754, a degree of acetyl group substitution of 2.07, and a degree of butyryl group substitution of 0.73.
- CA4: Daicel "L50", diacetyl cellulose, having a weight average degree of polymerization of 570.
- CA5: Daicel "LT-35", triacetyl cellulose, having a weight average degree of polymerization of 385.

[Aromatic Compound (B)]
- PAC1: Cardolite "NX-2503", hydroxyethylated cardanol, having a molecular weight of 296 to 320.
- PAC2: Cardolite "Ultra LITE 513", glycidyl ether of cardanol, having a molecular weight of 354 to 361.
- PAC3: DIC "EPICLON 865-alkyl-modified product" phenol novolak epoxy resin Examples 1 to 18 and Comparative Examples 1 to 3

(Preparation of Resin Pellets RE1 to RE13)

Kneading is performed by a biaxial kneading apparatus (TEX4SS manufactured by Toshiba Machine Co., Ltd.) using the charged composition ratios and the cylinder temperatures shown in Table 1 to prepare pellet-shaped resin compositions RE1 to RE13 (hereinafter, referred to as resin pellets RE1 to RE13).

(Preparation of resin particles)

—Preparation of resin particle PC1—

To 700 g of methyl ethyl ketone, 300 g of the resin pellet (RE1) is completely dissolved. The obtained solution is added to an aqueous liquid in which 100 g of calcium carbonate, 4 g of carboxymethyl cellulose, and 200 g of methyl ethyl ketone are dispersed in 1100 g of pure water, followed by stirring for 3 hours. To the obtained mixture is added 10 g of sodium hydroxide, heated to 80° C. and stirred for 3 hours to remove methyl ethyl ketone. After the residue is filtered, the solid is freeze-dried to obtain the resin particle PC1.

—Preparation of Resin Particles PC2 to PC18—

Resin particles PC2 to PC18 are obtained in the same manner as the resin particle PC1, except that the resin pellet, the amounts of the components (the amount of calcium carbonate, the amount of carboxymethyl cellulose, and the amount of methyl ethyl ketone) added into the aqueous liquid, the aqueous liquid stirring time, and the amount of sodium hydroxide added are changed according to Table 2.

—Preparation of Resin Particles PC19 and PC20—

Commercially available cellulosic particles, CELLULO-BEADS D10 (manufactured by DAITO KASEI KOGYO CO., LTD.) are prepared as the resin particle PC19 and BELLOCEA (manufactured by Daicel Corporation) are prepared as the resin particle PC20.

<Measurement of Particle Diameter, Particle Size Distribution and Solubility>

According to the method described above, the volume average particle diameter and the particle size distribution GSDv of the resin particle are measured using an LS particle size distribution measuring device Beckman Coulter LS13 320 (manufactured by Beckman Coulter, Inc.).

In addition, the solubility of the resin pellet which is the raw material of the resin particles is measured according to the method described above.

The results are shown in Table 2.

<Measurement of Biodegradability>

Using the obtained resin particles, the aerobic biodegradation rate is measured by the method according to ISO-14855-2 (2018), and the anaerobic biodegradation rate is measured by the method according to ISO-14853 (2016).

The time at which the biodegradation rate reaches 50% and 90% is evaluated as the biodegradation speed. The results are shown in Table 2.

TABLE 1

| Resin pellet | Cellulose acylate (A) Compound | Cellulose acylate (A) Part by mass | Aromatic compound (B) Compound | Aromatic compound (B) Part by mass | (B)/(A) | Kneading temperature (° C.) |
|---|---|---|---|---|---|---|
| RE1 | CA1 | 100 | PAC1 | 30 | 0.3 | 200 |
| RE2 | CA1 | 100 | PAC1 | 15 | 0.15 | 200 |
| RE3 | CA1 | 100 | PAC1 | 80 | 0.8 | 190 |
| RE4 | CA1 | 100 | PAC2 | 30 | 0.3 | 200 |
| RE5 | CA1 | 100 | PAC2 | 15 | 0.15 | 200 |
| RE6 | CA1 | 100 | PAC2 | 80 | 0.8 | 190 |
| RE7 | CA2 | 100 | PAC1 | 30 | 0.3 | 190 |
| RE8 | CA3 | 100 | PAC1 | 30 | 0.3 | 200 |
| RE9 | CA4 | 100 | PAC1 | 30 | 0.3 | 240 |
| RE10 | CA5 | 100 | PAC1 | 30 | 0.3 | 270 |
| RE11 | CA1 | 100 | PAC1 | 12 | 0.12 | 200 |
| RE12 | CA1 | 100 | PAC1 | 85 | 0.85 | 190 |
| RE13 | CA1 | 100 | PAC3 | 30 | 0.3 | 210 |
| RE14 | CA1 | 100 | — | — | 0 | 240 |

TABLE 2

| Resin particle | Resin pellet | Amount (g) added to aqueous liquid Calcium carbonate | Amount (g) added to aqueous liquid Carboxymethyl cellulose | Amount (g) added to aqueous liquid Methyl ethyl ketone | Aqueous liquid stirring time (hr) | Amount (g) of sodium hydroxide added | Particle diameter (μm) | GSDv | Solubility mg/ml |
|---|---|---|---|---|---|---|---|---|---|
| PC1 | RE1 | 100 | 4 | 200 | 3 | 10 | 30 | 1.17 | 300 |
| PC2 | RE1 | 250 | 4 | 200 | 3 | 10 | 3 | 1.21 | 320 |
| PC3 | RE1 | 40 | 4 | 200 | 3 | 10 | 100 | 1.19 | 290 |
| PC4 | RE1 | 100 | 4 | 200 | 3 | 5 | 32 | 1.48 | 290 |
| PC5 | RE2 | 100 | 4 | 200 | 3 | 10 | 28 | 1.18 | 210 |
| PC6 | RE3 | 100 | 4 | 200 | 3 | 10 | 31 | 1.19 | 420 |
| PC7 | RE4 | 100 | 4 | 200 | 3 | 10 | 27 | 1.25 | 300 |
| PC8 | RE5 | 100 | 4 | 200 | 3 | 10 | 20 | 1.3 | 220 |
| PC9 | RE6 | 100 | 4 | 200 | 3 | 10 | 25 | 1.22 | 410 |
| PC10 | RE7 | 100 | 4 | 200 | 3 | 10 | 22 | 1.23 | 320 |
| PC11 | RE8 | 100 | 4 | 200 | 3 | 10 | 23 | 1.25 | 360 |
| PC12 | RE9 | 100 | 4 | 200 | 3 | 10 | 28 | 1.22 | 220 |
| PC13 | RE10 | 100 | 4 | 200 | 3 | 10 | 35 | 1.21 | 200 |
| PC14 | RE11 | 100 | 4 | 200 | 3 | 10 | 32 | 1.19 | 190 |
| PC15 | RE12 | 100 | 4 | 200 | 3 | 10 | 33 | 1.17 | 440 |
| PC16 | RE1 | 400 | 4 | 200 | 3 | 10 | 1.5 | 1.18 | 270 |
| PC17 | RE1 | 10 | 4 | 200 | 3 | 10 | 110 | 1.21 | 260 |
| PC18 | RE1 | 100 | 4 | 200 | 1 | 0 | 32 | 1.53 | 250 |
| PC19 | CELLULOBEADS D-10 (manufactured by DAITO KASEI KOGYO CO., LTD.) | | | | | | 10 | 1.77 | 5 |
| PC20 | BELLOCEA (manufactured by Daicel Corporation) | | | | | | 20 | 1.89 | 40 |
| PC21 | RE13 | 100 | 4 | 200 | 3 | 10 | 30 | 1.22 | 240 |
| PC22 | RE14 | Dissolution to MEK is insufficient, so granulation is not performed. | | | | | | | 50 |

TABLE 3

| Category | Particle | Aerobic biodegradation rate 50% decomposition (day) | Aerobic biodegradation rate 90% decomposition (day) | Anaerobic biodegradation rate 50% decomposition (day) | Anaerobic biodegradation rate 90% decomposition (day) |
|---|---|---|---|---|---|
| Example 1 | PC1 | 3 | 7 | 4 | 10 |
| Example 2 | PC2 | 2 | 6 | 3 | 8 |
| Example 3 | PC3 | 4 | 9 | 6 | 12 |
| Example 4 | PC4 | 5 | 11 | 7 | 15 |
| Example 5 | PC5 | 4 | 8 | 6 | 11 |
| Example 6 | PC6 | 2 | 5 | 3 | 6 |
| Example 7 | PC7 | 5 | 10 | 6 | 14 |
| Example 8 | PC8 | 6 | 12 | 7 | 15 |
| Example 9 | PC9 | 3 | 8 | 4 | 11 |
| Example 10 | PC10 | 2 | 6 | 3 | 9 |

TABLE 3-continued

| | | Aerobic biodegradation rate | | Anaerobic biodegradation rate | |
| --- | --- | --- | --- | --- | --- |
| Category | Particle | 50% decomposition (day) | 90% decomposition (day) | 50% decomposition (day) | 90% decomposition (day) |
| Example 11 | PC11 | 3 | 7 | 4 | 11 |
| Example 12 | PC12 | 8 | 15 | 10 | 22 |
| Example 13 | PC13 | 10 | 20 | 13 | 26 |
| Comparative Example 1 | PC14 | 23 | 60 | 30 | 70 |
| Example 14 | PC15 | 16 | 45 | 24 | 66 |
| Example 15 | PC16 | 14 | 42 | 20 | 56 |
| Example 16 | PC17 | 16 | 45 | 23 | 65 |
| Example 17 | PC18 | 20 | 50 | 28 | 77 |
| Comparative Example 2 | CELLULOBEADS D-10 (manufactured by DAITO KASEI KOGYO CO., LTD.) | 25 | 62 | 32 | 80 |
| Comparative Example 3 | BELLOCEA (manufactured by Daicel Corporation) | 24 | 58 | 28 | 72 |
| Example 18 | PC21 | 6 | 15 | 11 | 24 |

The above results show that the resin particles of Examples 1 to 18 have a biodegradation speed higher than that of the resin particles of Comparative Examples 1 to 3.

Example 19 and Comparative Example 4

Using the resin pellets RE1 (corresponding to Examples) and RE1 (corresponding to Comparative Examples) shown in Table 1, a test piece having a size of 10 mm×12.5 mm and a thickness of 4 mm is injection-molded with an injection molding machine (NEX500I, manufactured by NISSEI PLASTIC INDUSTRIAL CO., LTD.) at an injection peak pressure not exceeding 180 MPa, a molding temperature of 190° C. and a mold temperature of 40° C.

The biodegradability of each test piece is measured. The results are shown in Table 4.

TABLE 4

| | | Aerobic biodegradation rate | | Anaerobic biodegradation rate | |
| --- | --- | --- | --- | --- | --- |
| Category | Resin pellet | 50% decomposition (day) | 90% decomposition (day) | 50% decomposition (day) | 90% decomposition (day) |
| Example 19 | RE1 | 7 | 18 | 10 | 24 |
| Comparative Example 4 | RE11 | 30 | 64 | 38 | 74 |

The above results show that the injection-molded product of Example 19 has a biodegradation speed higher than that of the injection-molded product of Comparative Example 4.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a cellulose acylate (A); and
   an aromatic compound (B) containing a long-chain aliphatic group and at least one of a phenolic hydroxy group and a monoglycidyl ether group directly bonded to an aromatic group of the aromatic compound (B),
   wherein a mass ratio (B)/(A) of the aromatic compound (B) to the cellulose acylate (A) is 0.15 or more, and
   a total amount of the cellulose acylate (A) and the aromatic compound (B) is 100 mass % with respect to the entire resin composition.

2. The resin composition according to claim 1,
   wherein the mass ratio (B)/(A) of the aromatic compound (B) to the cellulose acylate (A) is 0.15 or more and 0.80 or less.

3. The resin composition according to claim 2,
   wherein the mass ratio (B)/(A) of the aromatic compound (B) to the cellulose acylate (A) is 0.20 or more and 0.50 or less.

4. The resin composition according to claim 3,
   wherein the cellulose acylate (A) is at least one selected from the group consisting of a cellulose acetate propionate and a cellulose acetate butyrate.

5. The resin composition according to claim 3,
   wherein the aromatic compound (B) is a cardanol compound (B1).

6. The resin composition according to claim 5,
   wherein the cardanol compound (B1) is at least one compound selected from the group consisting of a compound represented by the following general formula (CDN1) and a polymer obtained by polymerizing the compound represented by the general formula (CDN1),

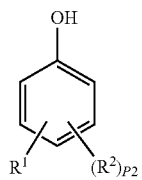

General Formula (CDN1)

in the general formula (CDN1), $R^1$ represents an alkyl group which may have a substituent, or an unsaturated aliphatic group which has a double bond and may have a substituent, $R^2$ represents a hydroxy group, a carboxy group, an alkyl group which may have a substituent, or an unsaturated aliphatic group which has a double bond and may have a substituent, P2 represents an integer of 0 or more and 4 or less, and a plurality of $R^2$s may be the same group or different groups when P2 is 2 or more.

7. The resin composition according to claim 2,
wherein the cellulose acylate (A) is at least one selected from the group consisting of a cellulose acetate propionate and a cellulose acetate butyrate.

8. The resin composition according to claim 2,
wherein the aromatic compound (B) is a cardanol compound (B1).

9. The resin composition according to claim 8,
wherein the cardanol compound (B1) is at least one compound selected from the group consisting of a compound represented by the following general formula (CDN1) and a polymer obtained by polymerizing the compound represented by the general formula (CDN1),

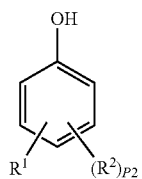

General Formula (CDN1)

in the general formula (CDN1), $R^1$ represents an alkyl group which may have a substituent, or an unsaturated aliphatic group which has a double bond and may have a substituent, $R^2$ represents a hydroxy group, a carboxy group, an alkyl group which may have a substituent, or an unsaturated aliphatic group which has a double bond and may have a substituent, P2 represents an integer of 0 or more and 4 or less, and a plurality of $R^2$s may be the same group or different groups when P2 is 2 or more.

10. The resin composition according to claim 1,
wherein the cellulose acylate (A) is at least one selected from the group consisting of a cellulose acetate propionate and a cellulose acetate butyrate.

11. The resin composition according to claim 10,
wherein the aromatic compound (B) is a cardanol compound (B1).

12. The resin composition according to claim 11,
wherein the cardanol compound (B1) is at least one compound selected from the group consisting of a compound represented by the following general formula (CDN1) and a polymer obtained by polymerizing the compound represented by the general formula (CDN1),

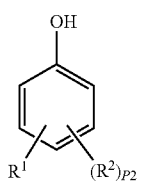

General Formula (CDN1)

in the general formula (CDN1), $R^1$ represents an alkyl group which may have a substituent, or an unsaturated aliphatic group which has a double bond and may have a substituent, $R^2$ represents a hydroxy group, a carboxy group, an alkyl group which may have a substituent, or an unsaturated aliphatic group which has a double bond and may have a substituent, P2 represents an integer of 0 or more and 4 or less, and a plurality of $R^2$s may be the same group or different groups when P2 is 2 or more.

13. The resin composition according to claim 1,
wherein the aromatic compound (B) is a cardanol compound (B1).

14. The resin composition according to claim 13,
wherein the cardanol compound (B1) is at least one compound selected from the group consisting of a compound represented by the following general formula (CDN1) and a polymer obtained by polymerizing the compound represented by the general formula (CDN1),

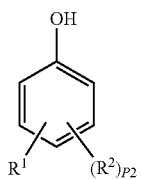

General Formula (CDN1)

in the general formula (CDN1), $R^1$ represents an alkyl group which may have a substituent, or an unsaturated aliphatic group which has a double bond and may have a substituent, $R^2$ represents a hydroxy group, a carboxy group, an alkyl group which may have a substituent, or an unsaturated aliphatic group which has a double bond and may have a substituent, P2 represents an integer of 0 or more and 4 or less, and a plurality of $R^2$s may be the same group or different groups when P2 is 2 or more.

15. A resin molded product comprising the resin composition according to claim 1.

16. The resin molded product according to claim 15 that is a granular material.

17. The resin molded product according to claim 16,
wherein a volume average particle diameter of the granular material is 3 μm or more and 100 μm or less.

18. The resin molded product according to claim 16, wherein a large-diameter-side particle size distribution index GSDv of the granular material is 1.5 or less.

19. A resin composition comprising:
a cellulose acylate (A); and
an aromatic compound (B) containing a long-chain aliphatic group and at least one of a phenolic hydroxy group and a monoglycidyl ether group directly bonded to an aromatic group of the aromatic compound (B),
wherein a solubility of the resin composition in methyl ethyl ketone at a liquid temperature of 25° C. is 200 mg/ml or more, and
a total amount of the cellulose acylate (A) and the aromatic compound (B) is 100 mass % with respect to the entire resin composition.

20. A resin molded product comprising the resin composition according to claim 15.

* * * * *